(12) United States Patent
Baek (10) Patent No.: US 11,044,531 B2
(45) Date of Patent: Jun. 22, 2021

(54) PERSONALIZED HOME SHOPPING PROVIDING APPARATUS

(71) Applicant: ANYPOINT MEDIA CO., LTD., Seoul (KR)

(72) Inventor: Wonjang Baek, Seongnam-si (KR)

(73) Assignee: ANYPOINT MEDIA CO., LTD., Seoul (KR)

( * ) Notice: Subject to any disclaimer, the term of this patent is extended or adjusted under 35 U.S.C. 154(b) by 0 days.

(21) Appl. No.: 16/896,198

(22) Filed: Jun. 8, 2020

(65) Prior Publication Data
US 2020/0304877 A1    Sep. 24, 2020

Related U.S. Application Data

(63) Continuation of application No. PCT/KR2018/014244, filed on Nov. 20, 2018.

(30) Foreign Application Priority Data

Dec. 21, 2017  (KR) .................. 10-2017-0176674

(51) Int. Cl.
*G06F 3/00*     (2006.01)
*G06F 13/00*    (2006.01)
*H04N 5/445*    (2011.01)
*H04N 21/478*   (2011.01)
*H04N 21/254*   (2011.01)
(Continued)

(52) U.S. Cl.
CPC ... *H04N 21/47815* (2013.01); *H04N 21/2542* (2013.01); *H04N 21/44213* (2013.01); *H04N 21/4665* (2013.01); *H04N 21/47202* (2013.01)

(58) Field of Classification Search
CPC ......... H04N 21/47815; H04N 21/2542; H04N 21/44213; H04N 21/4665; H04N 21/47202
See application file for complete search history.

(56) References Cited

U.S. PATENT DOCUMENTS

| 2016/0100207 A1* | 4/2016 | Uhm | H04N 21/25883 725/10 |
| 2018/0189841 A1* | 7/2018 | Lee | G06Q 30/0255 |
| 2018/0285897 A1* | 10/2018 | Seo | H04N 21/42204 |

FOREIGN PATENT DOCUMENTS

| JP | 2017-151821 A | 8/2017 |
| KR | 10-2012-0006694 A | 1/2012 |

(Continued)

OTHER PUBLICATIONS

English Translation of KR 10-2018-0112333 with Foreign Application Priority KR 10-2017-0043091 of US-20180285897-A1 (Year: 2017).*

(Continued)

*Primary Examiner* — Kyu Chae
(74) *Attorney, Agent, or Firm* — Stein IP, LLC (57) ABSTRACT

In accordance with the technique described herein, a home shopping content suitable for a specific viewer can be dynamically selected and provided using a product classification group of interest extracted based on the time at which a viewer selects a home shopping channel and the time at which the viewer leaves the home shopping channel. In particular, since the product classification group of interest can be extracted using an interest index calculated based on a bounce rate defined according to the technique described herein, the more personalized home shopping content can be provided to the viewer.

13 Claims, 8 Drawing Sheets

(51) Int. Cl.
 *H04N 21/442* (2011.01)
 *H04N 21/466* (2011.01)
 *H04N 21/472* (2011.01)

(56) References Cited

FOREIGN PATENT DOCUMENTS

| KR | 10-2013-0089794 A | | 8/2013 | |
|---|---|---|---|---|
| KR | 10-2014-0006383 A | | 1/2014 | |
| KR | 10-2014-0094892 A | | 7/2014 | |
| KR | 10-2016-0041437 A | | 4/2016 | |
| KR | 10-1751708 B1 | | 7/2017 | |
| KR | 10-2018-0079885 | * | 7/2018 | ............ G06Q 30/02 |
| KR | 10-2018-0112333 | * | 10/2018 | |
| KR | 10-1985743 B1 | | 6/2019 | |

OTHER PUBLICATIONS

English Translation of KR 10-2018-0079885 with Foreign Application Priority KR 10-2017-0000607 of US-20180189841-A1 (Year: 2017).*
International Search Report dated Feb. 27, 2019, issued to International Application No. PCT/KR2018/014244.
Korean Office Action dated Dec. 6, 2018, issued to Korean Application No. 10-2017-0176674.

* cited by examiner

| CHANNEL NO. 53 | |
|---|---|
| 07:15:05 AM | 07:15:24 AM |
| 07:50:23 AM | 07:50:25 AM |
| 08:05:10 AM | 08:05:30 AM |
| 08:30:10 AM | 08:50:30 AM |
| 09:10:00 AM | 09:40:30 AM |

. . .
. . .
. . .

| 10:05:00 PM | 10:50:30 PM |
|---|---|

PERSONALIZED HOME SHOPPING PROVIDING APPARATUS

CROSS-REFERENCE TO RELATED PATENT APPLICATION

This application is a bypass continuation of International Application No. PCT/KR2018/014244, filed on Nov. 20, 2018, in the WIPO, and Korean Patent Application No. 10-2017-0176674, filed on Dec. 21, 2017, in the Korea Intellectual Property Office, the entire contents of which are hereby incorporated by reference.

BACKGROUND

1. Field

The present disclosure relates to a personalized home shopping providing apparatus.

2. Description of the Related Art

The development in communication technologies and computing technologies is leading to fast development in broadcasting services. The ratings (viewer ratings) of the broadcasting services are measured to evaluate the efficiency of the broadcasting services. For example, a broadcasting service provider may use the ratings as a reference to evaluate quality such as viewer's satisfaction for the broadcasting services, and an advertiser may use the ratings as a reference to determine the advertisement effects from the broadcasting services.

The ratings are measured by selecting a sample group having uniform distribution in terms of, e.g., geographic location, age, gender, and education level, and collecting viewing behavior information about the broadcasting services provided to the sample group.

Since, however, the conventional rating measuring method measures the ratings of the sample group, the measured ratings are different from the actual ratings. In addition, since a complicated method is used to measure the ratings, even the ratings of the sample group are not accurately measured.

In order to solve such a drawback, Korean Patent No. 10-1751708 (Patent Document 1) entitled "Analysis method and system for audience rating and advertisement effects based on viewing behavior recognition", which was filed on Aug. 17, 2012 and registered on Jun. 22, 2017 by Electronics and Telecommunications Research Institute, discloses therein a method of measuring an audience rating of a sample group with higher accuracy by receiving a viewer image, generating viewer recognition information based on the received image, and generating viewing behavior information based on the viewer recognition information.

However, the method disclosed in Korean Patent No. 10-1751708 also uses a complicated method such as pre-registration of viewers for measuring the audience rating.

Meanwhile, the bounce rate generally represents a percentage of visitors who visit a website and then leave without receiving information or rather than continuing to view other pages within the website. More specifically, the bounce rate represents a percentage of visitors who visit a website having a start page and a sub-page linked to the start page and then leave without visiting the sub-page. A high bounce rate typically indicates that visitors only view a website with a low probability of behavior such as product purchase. A low bounce rate indicates that visitors view a website and proceeds to behavior such as product purchase at a high probability. Therefore, the bounce rate can be used as a reference for evaluating especially websites on the internet.

However, the bounce rate is used as a reference that can only be applied to the internet services such as a web page, and such a bounce rate cannot be applied to the broadcasting services. In other words, the broadcasting services provide contents continuously unlike the web page, so that there are no start page and no sub-pages. Therefore, the bounce rate applied to internet services cannot be applied to the broadcasting services.

Meanwhile, in general, home shopping refers to a service that is provided through a broadcast network or a communication network to purchase various goods or services. When the service is provided through, e.g., the broadcast network, the home shopping can be realized in such a manner that a home shopping company transmits a home shopping content of a product to a viewer's receiver through a predetermined channel and the viewer who watches the home shopping content purchases the product.

The broadcasting method used for home shopping may be digital broadcasting or analog broadcasting. The receiver may be, e.g., any one of a television, a set-top box, a personal computer, or a mobile communication terminal (i.e., smart phone) having a computing function each of which receives and provides a home shopping content.

The viewers can purchase a product in a broadcasted home shopping content using, e.g., a payment interface displayed on the receiver or a telephone ordering process.

However, the conventional home shopping has the following drawbacks.

A home shopping company transmits home shopping contents to all of multiple viewers at the same time based on broadcasting schedules. In other words, the conventional home shopping contents are provided to all of the viewers in the broadcasting manner. Therefore, it is not possible to provide home shopping contents for a limited target such as a particular viewer group or a particular viewer.

Further, since, in sequence of the broadcasting schedules, predetermined home shopping contents are transmitted to all of the multiple viewers, the viewers should wait until a desired home shopping content is scheduled to purchase a desired product.

Korean Patent Application Publication No. 10-2014-0006383 (Patent Document 2) entitled "Product selling system and server for connecting on-line shopping and home-shopping", which was filed on Jul. 5, 2012 and published on Jan. 16, 2014 by CJ O SHOPPING CO., LTD, discloses a method of selling a product suitable for a viewer through a home shopping channel while a home shopping and an online shopping interwork with each other. However, according to the method disclosed in Korean Patent Application Publication No. 10-2014-0006383, it is merely disclosed that the product to be sold through the home shopping channel is selected based on product information received from an online server. The method disclosed in Korean Patent Application Publication No. 10-2014-0006383 may be advantageous in that it is possible to select a suitable product and broadcast the suitable product to a larger number of viewers. However, the method still has the drawback of the conventional case described above.

RELATED ART DOCUMENT

Patent Document

Patent Document 1: Korean Patent No. 10-1751708
Patent Document 2: Korean Patent Application Publication No. 10-2014-0006383.

SUMMARY

Described herein is a technique capable of providing a personalized home shopping providing apparatus capable of dynamically selecting and providing a home shopping content suitable for a specific viewer using a product classification group of interest extracted based on a time at which a viewer selects a home shopping channel and a time at which the viewer leaves the home shopping channel.

According to one aspect of the technique of the present disclosure, there is provided a personalized home shopping providing apparatus including: one or more processors; one or more memories; and one or more programs that are stored in the one or more memories and executed by the one or more processors. Further, the one or more programs includes: a first instruction that, when executed, generates a viewing history of a home shopping channel and transmits the viewing history to a predetermined broadcast system; a second instruction that, when executed, receives a viewer input of selecting the home shopping channel; and a third instruction that, when executed, performs a signal-processing of a content selected from among a first personalized content to an m-th personalized content and a basic content that is provided by the predetermined broadcast system by using a product classification group of interest and provides the signal-processed content where "m" is a natural number greater than or equal to 1 and the product classification group of interest is extracted from a product classification criterion including a first product classification to a k-th product classification based on the viewing history where "k" is a natural number of 2 or more.

DETAILED DESCRIPTION

Hereinafter, one or more embodiments (also simply referred to as "embodiments") of a personalized home shopping providing apparatus according to the technique of the present disclosure will be described in detail with reference to the accompanying drawings. In the drawings for describing the embodiments of the present disclosure, only a part of the practical configurations may be illustrated, a part of the practical configurations may be omitted or changed, and relative dimensions and proportions of parts therein may be exaggerated or reduced in size for the sake of convenience of description.

First Embodiment

Figure 1:
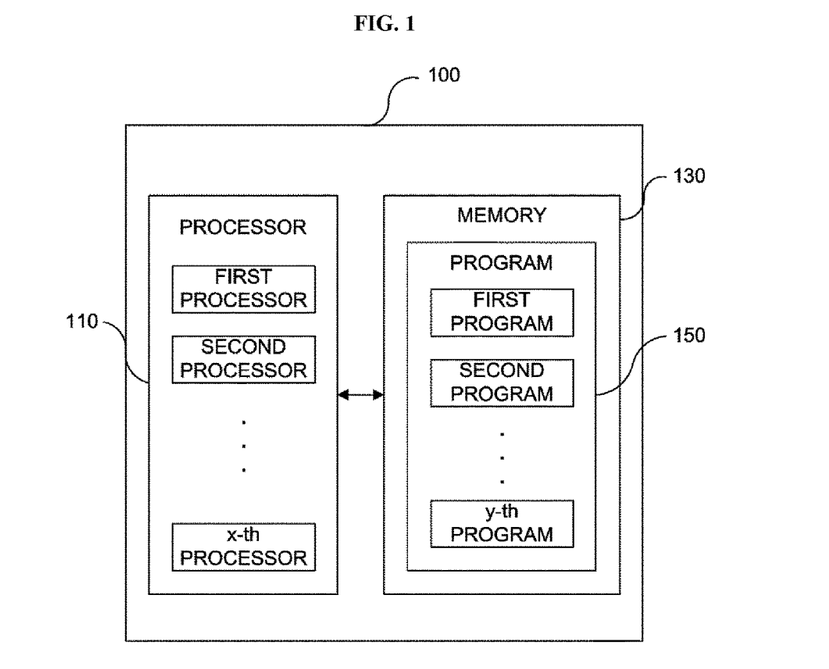
FIG. 1 is a block diagram showing an exemplary configuration of a personalized home shopping providing apparatus according to one or more embodiments described herein.

FIG. 1 is a block diagram showing an exemplary configuration of a personalized home shopping providing apparatus according to the embodiments described herein.

Referring to FIG. 1, a personalized home shopping providing apparatus 100 according to the embodiments described herein includes one or more processors 110, one or more memories 130, and one or more programs 150 that are stored in the one or more memories 130 and executed by the one or more processors 110. The one or more processors 110 may be implemented by a semiconductor device such as a CPU (Central Processing Unit). The one or more memories 130 may be implemented by a semiconductor device such as a flash memory and a HDD (Hard Disk Drive).

The one or more processors 110 read and execute the one or more programs 150 stored in the one or more memories 130. In FIG. 1, the number of processors 110 is x where x is a natural number and, thus, there may be one processor 110 or multiple processors 110. In other words, the function of the personalized home shopping providing apparatus 100 can be realized by one processor or a cooperative operation of multiple processors. For example, the function of the personalized home shopping providing apparatus 100 can be realized by causing a first processor to execute a calculation function and a second processor to execute a communication function.

The one or more memories 130 store the one or more programs 150. The one or more memories 130 are storage media such as a non-volatile memory or a volatile memory that is computer-readable storage medium. In FIG. 1, although one memory 130 is illustrated, there may be multiple memories 130.

Further, in FIG. 1, the number of programs 150 is y where y is a natural number and, thus, there may be one program 150 or multiple programs 150. In other words, the function of the personalized home shopping providing apparatus 100 can be realized by one program or by a cooperative operation of multiple programs. For example, the function of the personalized home shopping providing apparatus 100 can be realized by causing a first program to execute a calculation function and a second program to execute a communication function.

Hereinafter, the one or more processors 110, the one or more memories 130, the one or more programs 150 will be referred to as "processor 110," "memory 130," and "program 150," respectively.

Figure 2:
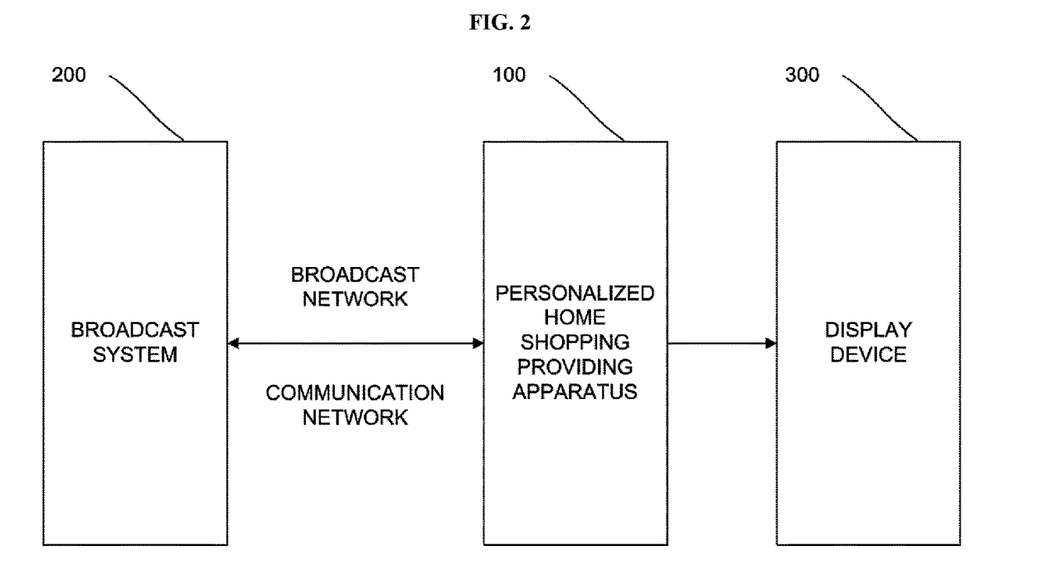
FIG. 2 shows a system environment in which the personalized home shopping providing apparatus according to the embodiments described herein operates.

FIG. 2 shows a system environment in which the personalized home shopping providing apparatus according to the embodiments described herein operates.

Referring to FIG. 2, the system environment in which the personalized home shopping providing apparatus according to the embodiments described herein operates includes the personalized home shopping providing apparatus 100 and a broadcast system 200 of a provider operating a home shopping channel. The system environment in which the personalized home shopping providing apparatus operates may further include a display device 300.

The personalized home shopping providing apparatus 100 may be, e.g., any one of a set-top box, a television, a personal computer, and a mobile communication terminal having a computing function, each of which receives and provides digital broadcasting. In this specification, "digital broadcasting" refers to broadcasting services such as digital terrestrial broadcasting, digital cable broadcasting, digital satellite broadcasting, digital multimedia broadcasting (DMB), interne protocol television (IP-TV), over the top (OTT), and video on demand (VOD) broadcasting. The detailed configuration of the personalized home shopping providing apparatus 100 will be described later.

The broadcast system 200 transmits a home shopping content to the personalized home shopping providing apparatus 100 through a broadcast network or a communication network. The broadcast system 200 may provide one or more home shopping contents to the personalized home shopping providing apparatus 100. In particular, the broadcast system 200 may provide the home shopping content (personalized home shopping content) to the personalized home shopping providing apparatus 100 using a product classification group specified based on a time at which the viewer selects the home shopping channel and a time at which the viewer leaves the home shopping channel.

The display device 300 displays the home shopping content that is signal-processed and provided by the personalized home shopping providing apparatus 100. For example, if the personalized home shopping providing apparatus 100 is the set-top box that receives and provides the digital broadcasting, the display device 300 may be provided separately from the personalized home shopping providing apparatus 100. Further, for example, if the personalized home shopping providing apparatus 100 is the television that receives and provides the digital broadcasting, the display device 300 may be provided integrally with the television, i.e., in the form of a television screen.

Figure 3:
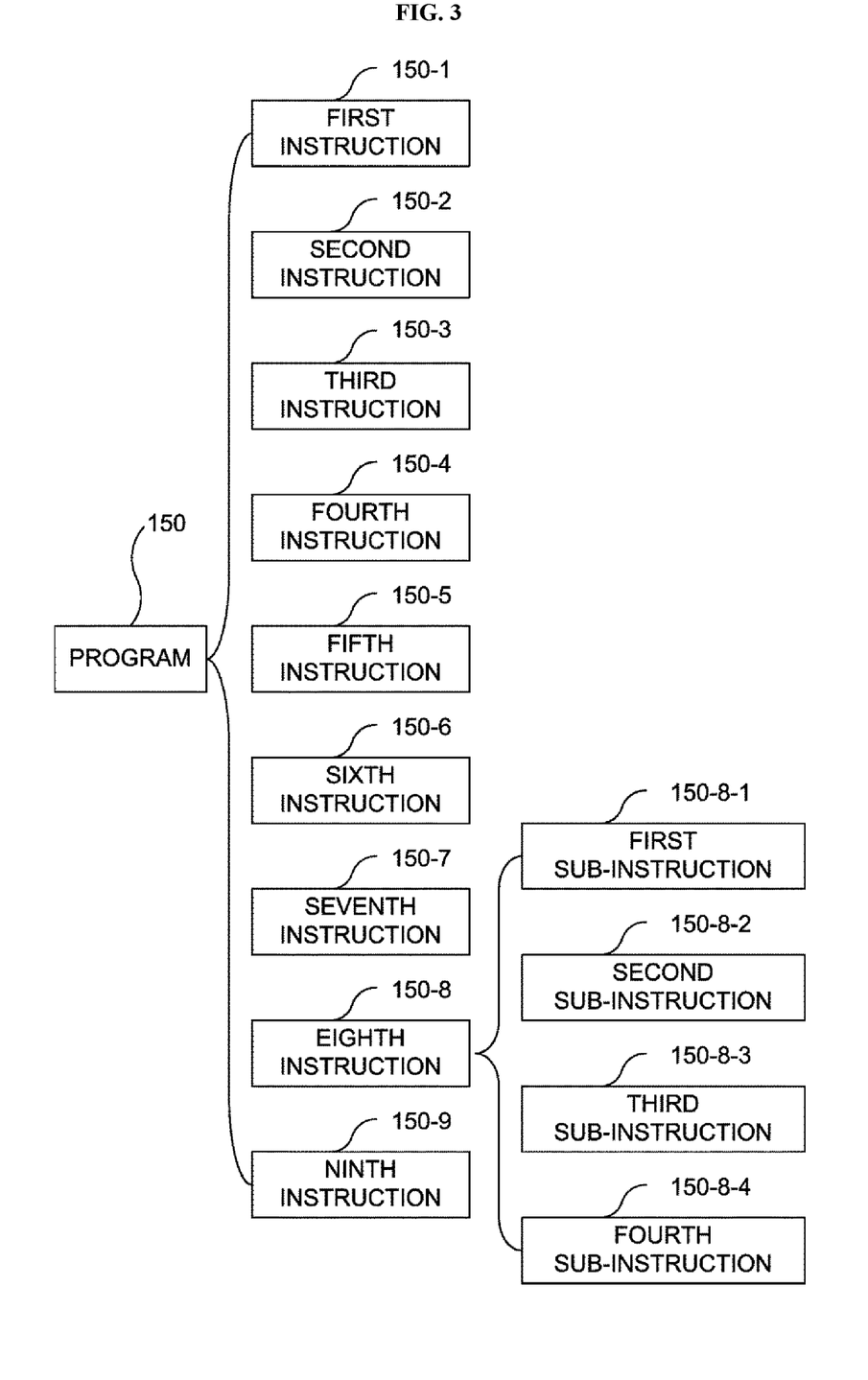
FIG. 3 is a block diagram showing an example of a program that is stored in and executed by the personalized home shopping providing apparatus according to the embodiments described herein.

FIG. 3 is a block diagram showing an example of a program that is stored in and executed by the personalized home shopping providing apparatus according to the embodiments described herein.

Referring to FIG. 3, the program 150 includes a first instruction 150-1 to a third instruction 150-3. The program 150 may further include at least one of a fourth instruction 150-4 to a ninth instruction 150-9. Further, the eighth instruction 150-8 may include a first sub-instruction 150-8-1 to a fourth sub-instruction 150-8-4.

The first instruction 150-1, when executed, generates a viewing history of the home shopping channel and transmits the viewing history to a predetermined broadcast system.

The viewing history of the home shopping channel includes the time at which the provision of the home shopping channel is started (i.e., the time at which the viewer selects the home shopping channel), and one of the time at which the provision of the home shopping channel is ended (i.e., the time at which the viewer leaves the home shopping channel) and the difference between the time at which the provision of the home shopping channel is ended and the time at which the provision of the home shopping channel is started (i.e., the time period for continuing to view the home shopping channel).

Figure 4:
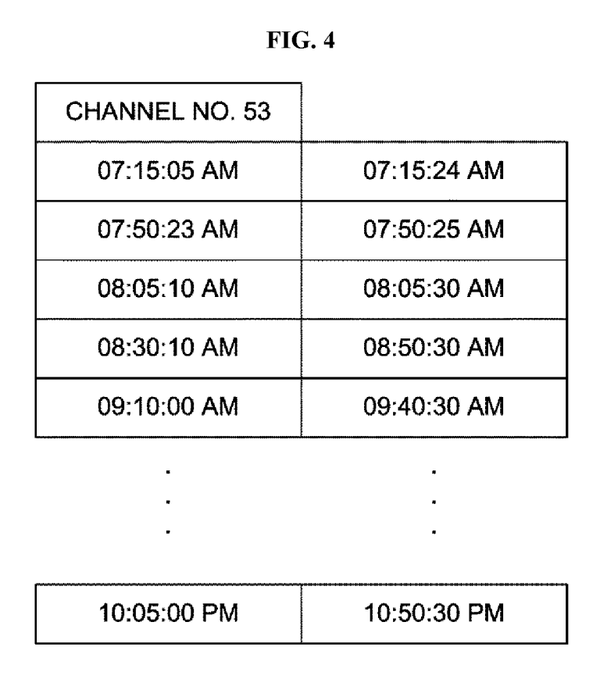
FIG. 4 shows an example of a viewing history of a home shopping channel in the personalized home shopping providing apparatus according to the embodiments described herein.

FIG. 4 shows an example of the viewing history of the home shopping channel in the personalized home shopping providing apparatus according to the embodiments described herein.

For example, when the home shopping channel is a channel No. 53, the first instruction 150-1 generates, e.g., a viewing history including the time at which the provision of the home shopping channel is started and the time at which the provision of the home shopping channel is ended. The time at which the provision of the home shopping channel is started is, for example, the time at which the viewer selects the channel No. 53 through a remote controller. The time at which the provision of the home shopping channel is ended is, for example, the time at which the viewer who is watching the channel No. 53 selects another channel through the remote controller or the time at which the viewer presses a button to turn off the power of the personalized home shopping providing apparatus 100.

Although FIG. 4 illustrates the case in which the viewing history of the home shopping channel includes the time at which the provision of the home shopping channel is started and the time at which the provision of the home shopping channel is ended, the viewing history of the home shopping channel may include the time period for continuing to view the home shopping channel described above instead of the time at which the provision of the home shopping channel is ended.

The second instruction 150-2, when executed, receives a viewer input of selecting the home shopping channel. In other words, after the first instruction 150-1 is performed, the viewer of the personalized home shopping providing apparatus 100 can select the home shopping channel through, e.g., the remote controller of the set-top box or the television.

The third instruction 150-3, when executed, performs a signal-processing of a content selected from among a first personalized content to an m-th personalized content (m being a natural number greater than or equal to 1) and a basic content that can be provided by the broadcast system 200 by using a product classification group of interest and provides the signal-processed content. Through the third instruction 150-3, the personalized home shopping providing apparatus 100 may provide the content after performing the signal processing of the content.

The product classification group of interest may be extracted from a product classification criterion including a first product classification to a k-th product classification (k being a natural number of 2 or more) based on the viewing history.

Figure 5:
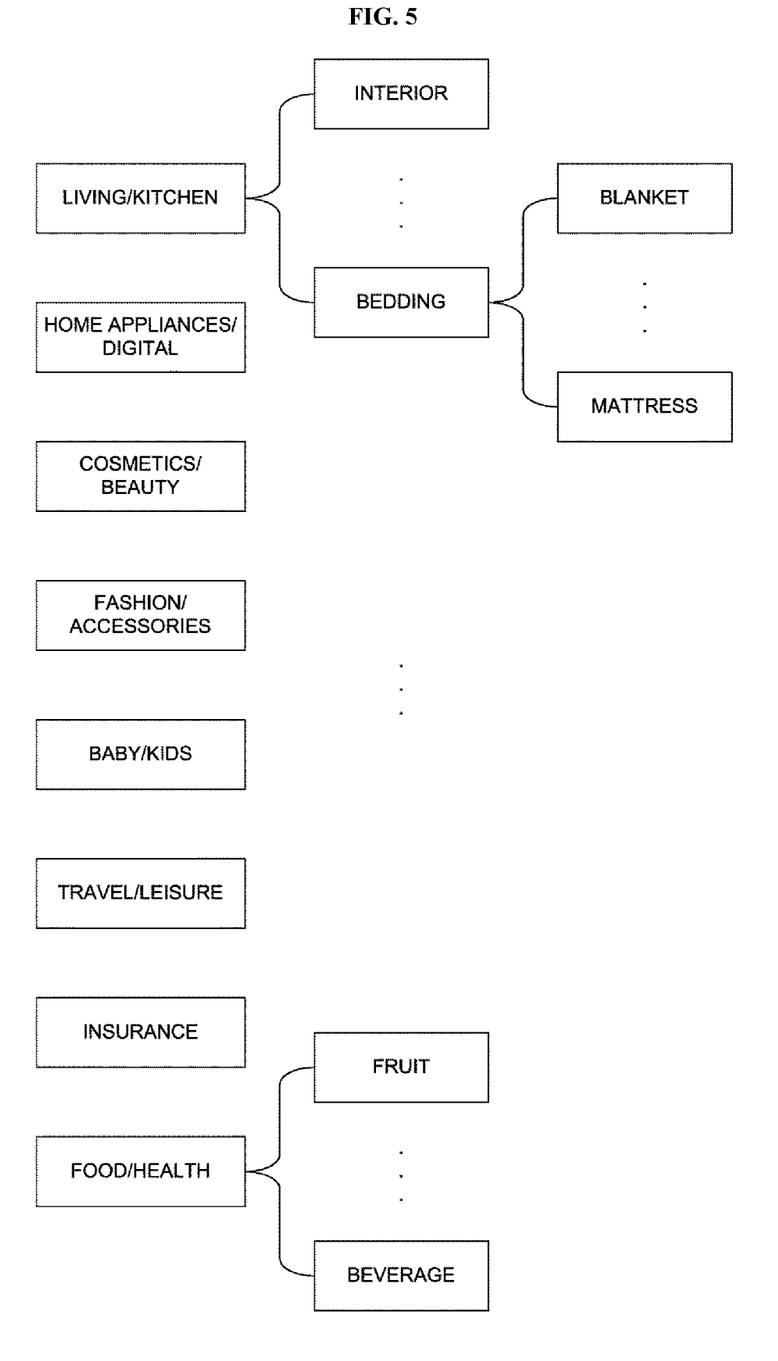
FIG. 5 shows an example of a product classification criterion used in the personalized home shopping providing apparatus according to the embodiments described herein.

FIG. 5 shows an example of a product classification criterion used in the personalized home shopping providing apparatus according to the embodiments described herein.

Referring to FIG. 5, the product classification criterion is set hierarchically and is configured to include, e.g., a first class including "living/kitchen" to "food/health"; a second class including "interior" to "bedding" being subordinate to the first class of "living/kitchen"; and a third class including "blanket" to "mattress" being subordinate to the second class of "bedding."

Each of the first to k-th product classifications may be determined and classified by any one of the first class to the third class. In other words, "k" may be the number of product classification classified by any one of the first class to the third class. The class to be used can be appropriately determined by a manager of the broadcast system 200, e.g., the broadcast system 200 maintained by the provider operating the home shopping channel.

Hereinafter, the product classification group of interest will be described in detail.

The product classification group of interest includes a product classification that is expected to be of interest to a user (viewer) of the personalized home shopping providing apparatus 100.

Figure 6:
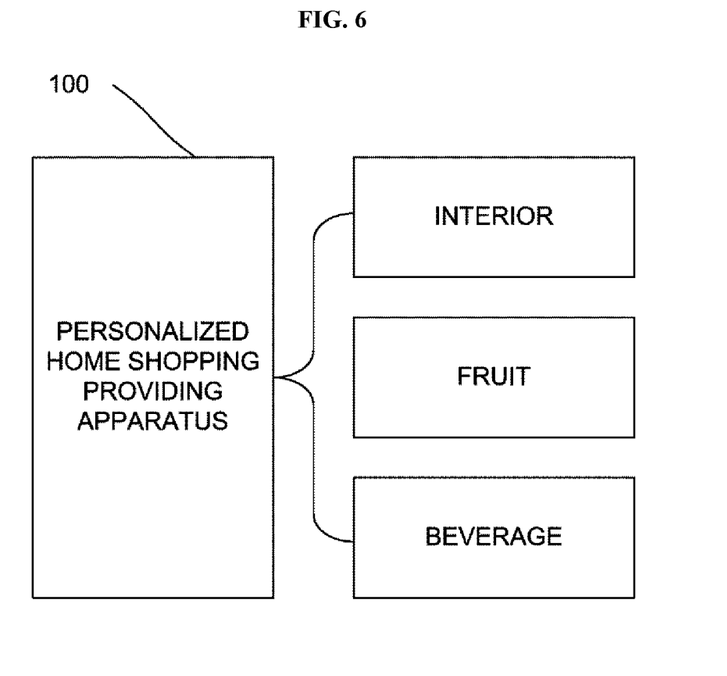
FIG. 6 shows an example of a product classification group of interest in the personalized home shopping providing apparatus according to the embodiments described herein.

FIG. 6 shows an example of the product classification group of interest in the personalized home shopping providing apparatus according to the embodiments described herein.

Referring to FIG. 6, the product classification group of interest may include three product classifications such as "interior," "fruit," and "beverage." In other words, the product classification group of interest may include one or more product classifications among the first to k-th product classifications. The details of extracting the product classification group of interest will be described later.

The first to m-th personalized contents and the basic content may be transmitted in real time or semi-real time from the broadcast system 200 to the personalized home shopping providing apparatus 100 through a broadcast network or a communication network.

The content is one of the first to m-th personalized contents and the basic content, and an example of a method of transmitting and receiving the content will be described below.

First, a broadcast method may be used to transmit the content from the broadcast system 200 to the personalized home shopping providing apparatus 100. In other words, the content may be transmitted to all receivers subscribed to the broadcast system 200 using the home shopping channel of the broadcast system 200.

For example, when "m" is 2, the basic content, the first personalized content, and the second personalized content are all transmitted to the home shopping channel of the personalized home shopping providing apparatus 100.

Next, a multicast method or a unicast method may be used to transmit the content from the broadcast system 200 to the personalized home shopping providing apparatus 100. For example, the content may be transmitted only to a receiver(s) belonging to a specific group or a specific receiver(s) among all of the receivers subscribed to the broadcast system 200 using the home shopping channel of the broadcast system 200. For example, when "m" is 2, only the content selected from among the basic content, the first personalized content, and the second personalized content is transmitted to the home shopping channel of the personalized home shopping providing apparatus 100.

The content may be transmitted only to the receiver(s) belonging to a specific group or a specific receiver(s) among all the receivers subscribed to the broadcast system 200 using the home shopping channel of the broadcast system 200. For example, when "m" is 2, only the content selected from among the basic content, the first personalized content, and the second personalized content is transmitted to the home shopping channel of the personalized home shopping providing apparatus 100.

Next, a VOD method may be used to transmit the content from the broadcast system 200 to the personalized home shopping providing apparatus 100. For example, when the personalized home shopping providing apparatus 100 transmits a request for transmitting the content to the broadcast system 200, the broadcast system 200 transmits the content to the personalized home shopping providing apparatus 100.

Hereinafter, a selection of the content provided through the third instruction 150-3 will be described in more detail.

As described above, the program 150 may further include the fourth instruction 150-4.

The fourth instruction 150-4, when executed, dynamically selects a content from among the first to m-th personalized contents and the basic content based on a product classification group of interest and receives the selected content from the broadcast system 200.

In other words, the personalized home shopping providing apparatus 100 selects the content from among the first to m-th personalized contents and the basic content through the fourth instruction 150-4 and receives the selected content from the broadcast system 200. The content may be transmitted from the broadcast system 200 by using the broadcast method, the multicast method or the unicast method described above.

The content selected and received through the fourth instruction 150-4 is then signal-processed and provided to the viewer through the third instruction 150-3.

Figure 7:
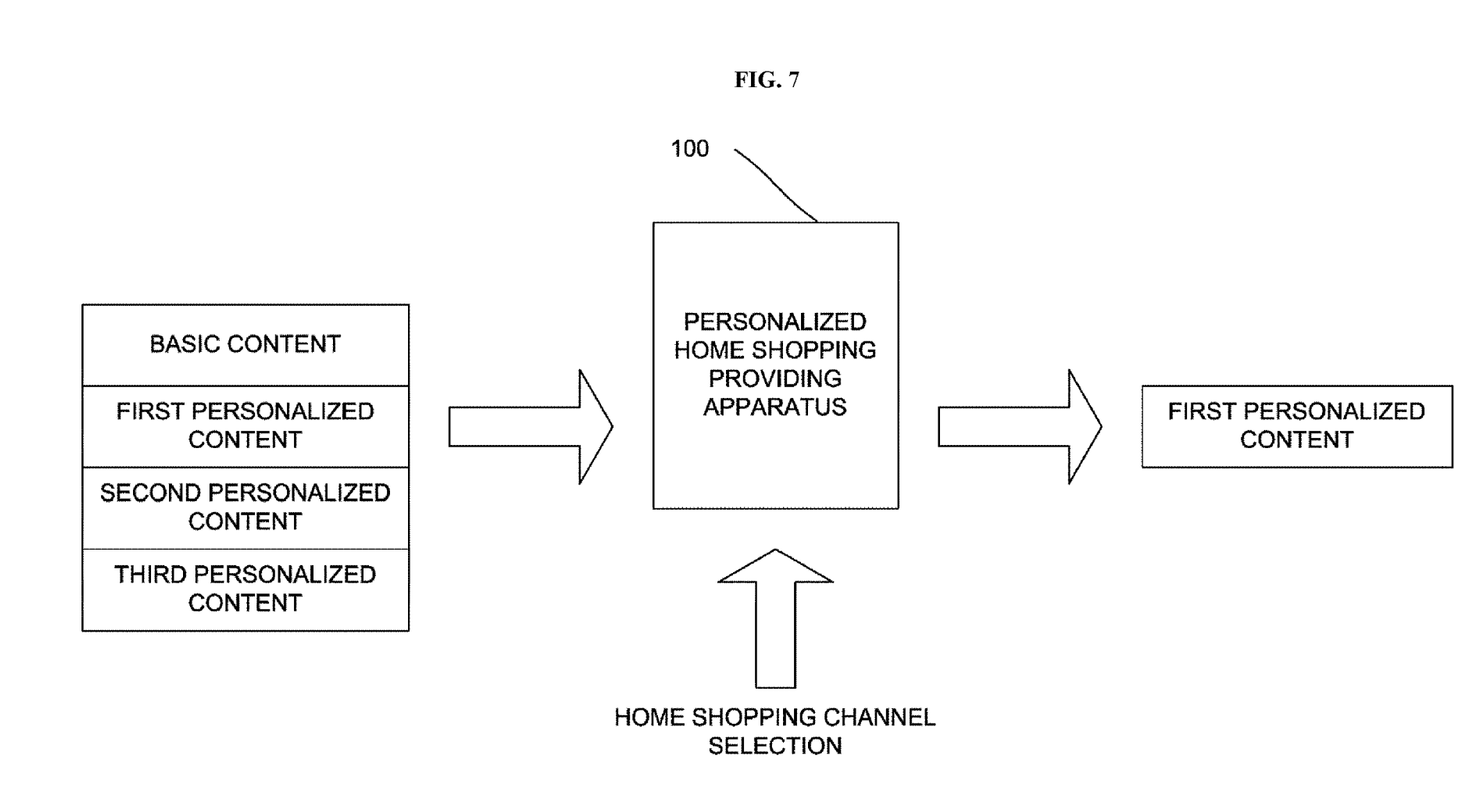
FIGS. 7 to 9 show examples of a process of receiving and providing a personalized content in the personalized home shopping providing apparatus according to the embodiments described herein.

FIG. 7 shows an example of a process of receiving and providing the personalized content in the personalized home shopping providing apparatus according to the embodiments described herein.

Referring to FIG. 7, for example, when "m" is 3, the broadcast system 200 transmits the basic content, the first personalized content, the second personalized content, and a third personalized content to the personalized home shopping providing apparatus 100. The personalized home shopping providing apparatus 100 selects, e.g., the first personalized content through the fourth instruction 150-4, and the selected first personalized content is signal-processed and provided to the viewer by the personalized home shopping providing apparatus 100 through the third instruction 150-3.

As described above, the program 150 may further include the fifth instruction 150-5.

The fifth instruction 150-5, when executed, receives the content selected by the broadcast system 200 based on a product classification group of interest.

In other words, unlike the fourth instruction 150-4, the content is selected by the broadcast system 200, and the personalized home shopping providing apparatus 100 receivers the content selected by the broadcast system 200 through the fifth instruction 150-5. The content may be transmitted from the broadcast system 200 by using the broadcast method, the multicast method, or the unicast method.

Figure 8:
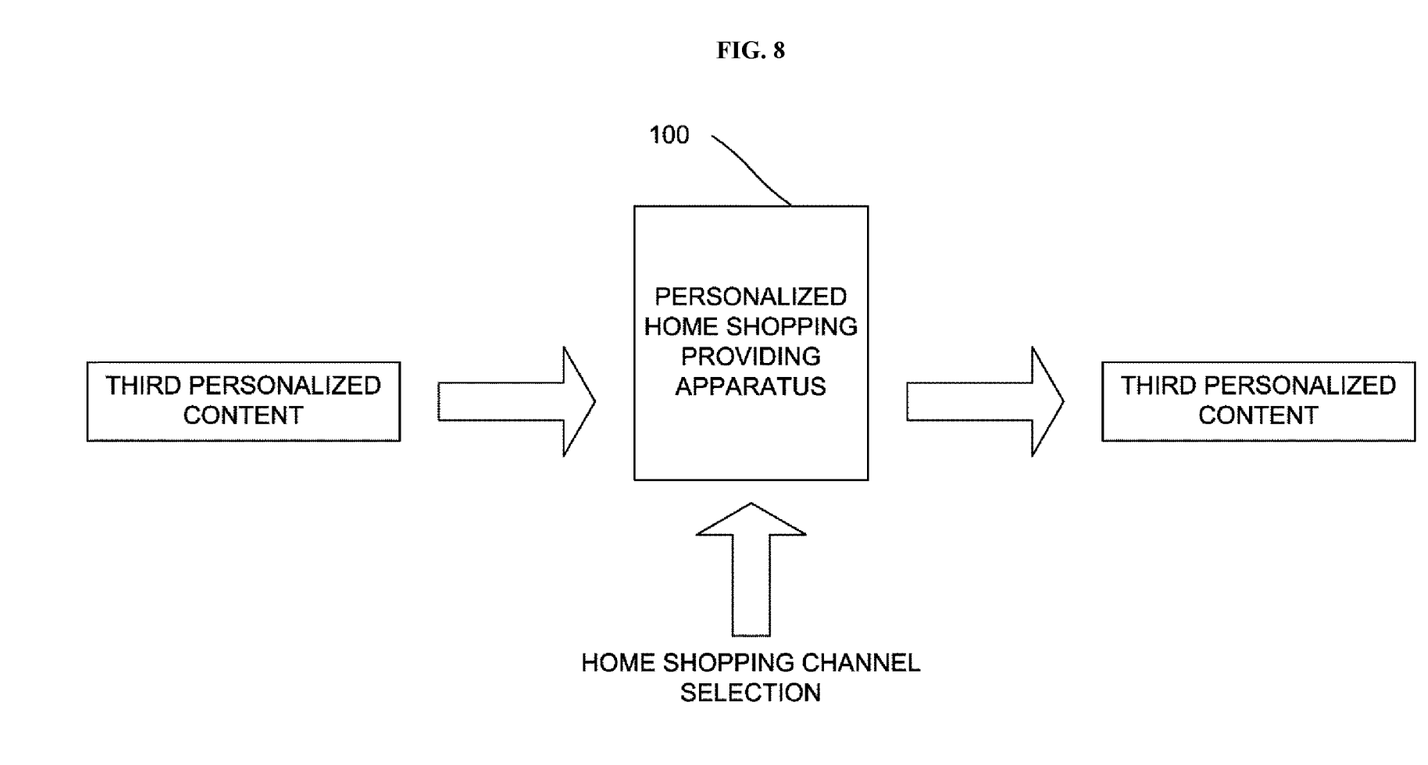

FIG. 8 shows an example of a process of receiving and providing the personalized content in the personalized home shopping providing apparatus according to the embodiments described herein.

Referring to FIG. 8, for example, when "m" is 3, the broadcast system 200 transmits a content selected from among, e.g., the basic content, the first personalized content, the second personalized content, and the third personalized content based on a product classification group of interest to the personalized home shopping providing apparatus 100. For example, the third personalized content is only transmitted from the broadcast system 200 to the personalized home shopping providing apparatus 100. Further, the personalized home shopping providing apparatus 100 receives the content, e.g., the third personalized content, selected by the broadcast system 200 through the fifth instruction 150-5, and the received third personalized content is signal-processed and provided to the viewer by the personalized home shopping providing apparatus 100 through the third instruction 150-3.

As described above, the program 150 may further include the sixth instruction 150-6.

The sixth instruction 150-6, when executed, dynamically selects a content from among the first to m-th personalized contents and the basic content based on a product classification group of interest, transmits a request for transmitting the selected content to the broadcast system 200, and receives the selected content from the broadcast system 200. In other words, the personalized home shopping providing apparatus 100 selects the content from among the first to m-th personalized contents and the basic content through the fourth instruction 150-4. However, unlike the fourth instruction 150-4, the personalized home shopping providing apparatus 100 transmits a request for transmitting the selected content to the broadcast system 200 and receives the selected content from the broadcast system 200. That is, the content is received from the broadcast system 200 by using the VOD method, for example.

Figure 9:
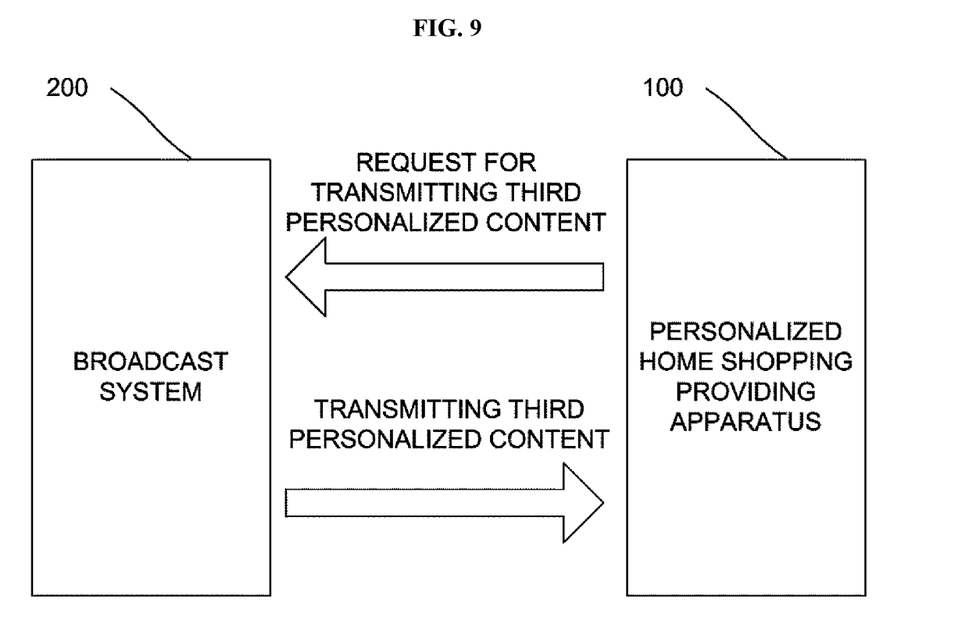

FIG. 9 shows an example of a process of receiving and providing the personalized content in the personalized home shopping providing apparatus according to the embodiments described herein.

Referring to FIG. 9, for example, when "m" is 3, the personalized home shopping providing apparatus 100 selects a content, e.g., the third personalized content, from among the first to m-th personalized contents and the basic content based on a product classification group of interest through the sixth instruction 150-6. Thereafter, the personalized home shopping providing apparatus 100 transmits a request for transmitting the content, e.g., the third personalized content, selected through the sixth instruction 150-6 to the broadcast system 200 and receives the third personalized content from the broadcast system 200. The received third personalized content is signal-processed and provided to the viewer by the personalized home shopping providing apparatus 100 through the third instruction 150-3.

As described above, the fourth instruction 150-4 and the sixth instruction 150-6 use the product classification group of interest to select the content. To this end, as described above, the program 150 may further include a seventh instruction 150-7.

The seventh instruction 150-7, when executed, receives and stores the product classification group of interest from the broadcast system 200. For example, the personalized home shopping providing apparatus 100 may periodically receive and store a product classification group of interest from the broadcast system 200 through the seventh instruction 150-7.

The product classification group of interest may preferably be extracted by the broadcast system 200.

The broadcast system 200 may extract the product classification group of interest by performing the following first to fourth processes, for example.

A first process, when executed, analyzes the broadcasting schedule of the home shopping channel and the viewing history of the home shopping channel received from the personalized home shopping providing apparatus 100 to determine each of a first reference frequency to a k-th reference frequency where the first reference frequency is the number of times that a product belonging to a first product classification is provided through the home shopping channel for a time period longer than or equal to a first threshold from a selection of the home shopping channel during a predetermined period and the k-th reference frequency is the number of times that a product belonging to a k-th product classification is provided through the home shopping channel for a time period longer than or equal to the first threshold from the selection of the home shopping channel during the predetermined period. The first process also determines each of a first bounce frequency to a k-th bounce frequency where the first bounce frequency is the number of times that the product belonging to the first product classification is provided through the home shopping channel for a time period longer than or equal to the first threshold and shorter than or equal to a second threshold from the selection of the home shopping channel during the predetermined period and the k-th bounce frequency is the number of times that the product belonging to the k-th product classification is provided through the home shopping channel for a time period longer than or equal to the first threshold and shorter than or equal to the second period from the selection of the home shopping channel during the predetermined period.

The predetermined period can be set to, e.g., one day, one week, or one month.

The first threshold is determined while considering a delay time from when the personalized home shopping providing apparatus 100 receives a user input of selecting the home shopping channel to when the home shopping channel is signal-processed and broadcasted. For example, a predetermined period of time may be required from when the personalized home shopping providing apparatus 100 receives the user input of selecting the home shopping channel, e.g., the channel No. 53, to when the channel No. 53 is signal-processed and broadcasted. In addition, the viewer can select the home shopping channel by pressing a channel-up button instead of directly selecting a channel number. The first threshold is determined while considering such a period of time. For example, the first threshold may be set to three seconds.

The second threshold indicates a period of time required for a viewer who has selected the home shopping channel and has checked the content of the home shopping channel to determine whether to keep watching the home shopping channel or to switch to another channel. In other words, the second threshold indicates a period of time required for a viewer to determine whether or not to keep watching the home shopping channel without channel zapping. The second threshold may be set to, e.g., 30 seconds.

When the broadcasting schedule of the home shopping channel is used, it is possible to check which product was being provided at the time when the provision of the home shopping channel is started in the viewing history.

Each of the first to k-th reference frequencies and each of the first to k-th bounce frequencies may be determined when a desired product is being broadcasted at the time of selecting the home shopping channel in the personalized home shopping providing apparatus 100. In other words, the case where the viewer keeps watching the home shopping channel without switching to another channel or the case where the advertisement is being broadcasted at the time of selecting the home shopping channel is preferably not included in the determination of each of the first to k-th reference frequencies and the first to k-th bounce frequencies.

The second process, when executed, determines a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency.

The first bounce rate is used to measure an interest level of a viewer of the personalized home shopping providing apparatus 100 with respect to a product belonging to the first product classification. In other words, if the first bounce rate is low, it is determined that the viewer of the personalized home shopping providing apparatus 100 is highly interested in the product belonging to the first product classification. On the contrary, if the first bounce rate is high, it is determined that the viewer of the personalized home shopping providing apparatus 100 has a low interest in the product belonging to the first product classification. The k-th bounce rate can be used in a similar manner.

The third process, when executed, analyzes the viewing history to calculate a first average viewing time to a k-th average viewing time where the first average viewing time is a time period during which a product belonging to the first product classification is provided through the home shopping channel during the predetermined period and the k-th average viewing time is a time period during which a product belonging to the k-th product classification is provided through the home shopping channel during the predetermined period.

The fourth process, when executed, compares interest indices for the first to k-th product classifications with a predetermined threshold where the interest index for the first product classification is extracted based on the first average viewing time and the first bounce rate and the interest index for the k-th product classification is extracted based on the k-th average viewing time and the k-th bounce rate. Then, the fourth process specifies a product classification(s) having an interest index higher than the predetermined threshold among the first to k-th product classifications as the product classification group of interest.

An interest index for a j-th product classification (j being a natural number greater than or equal to 1 and smaller than or equal to k) among the first to k-th product classifications can be determined as, e.g., a value obtained by subtracting, from a value obtained by multiplying a normalized j-th average viewing time by a first weight, a value obtained by multiplying a normalized j-th bounce rate by a second weight.

The normalized j-th average viewing time may be within a range of, e.g., 1 to 100. The normalized j-th bounce rate may be within a range of, e.g., 1 to 100.

The first weight and the second weight may be positive numbers, and the sum of the first weight and the second weight may be 1. On the assumption that the first weight is 0.8; the second weight is 0.2; the threshold is 50; the normalized j-th average viewing time is 80; and the normalized j-th bounce rate is 60, the value obtained by subtracting the value obtained by multiplying the normalized j-th bounce rate by the second weight from the value obtained by multiplying the normalized j-th average viewing time by the first weight is 52, which is higher than the threshold. In this case, the j-th product classification can be included in the product classification group of interest for the personalized home shopping providing apparatus 100.

By executing the first to fourth processes while appropriately changing j, it is possible to extract the product classification group of interest for the personalized home shopping providing apparatus 100.

The broadcast system 200 transmits the extracted product classification group of interest to the personalized home shopping providing apparatus 100. The personalized home shopping providing apparatus 100 stores the product classification group of interest and uses the product classification group of interest to select the content through, e.g., the fourth instruction 150-4 and the sixth instruction 150-6.

Second Embodiment

In the first embodiment, the configuration in which the personalized home shopping broadcast system 100 receives from the broadcast system 200 and stores the product classification group of interest therein through the seventh instruction 150-7 has been described as an example. However, the personalized home shopping broadcast system 100 may extract a product classification group of interest.

To this end, as described above, the program 150 may further include the eighth instruction 150-8.

The eighth instruction 150-8, when executed, extracts a product classification group of interest based on the broadcasting schedule and the viewing history of the home shopping channel.

As described above, the eighth instruction 150-8 may include the first to fourth sub-instructions 150-8-1 to 150-8-4.

The first sub-instruction 150-8-1, when executed, analyzes the broadcasting schedule of the home shopping channel and the viewing history of the home shopping channel generated through the first instruction 150-1 to determine each of a first reference frequency to a k-th reference frequency where the first reference frequency is the number of times that a product belonging to the first product classification is provided through the home shopping channel for a time period longer than or equal to a first threshold from a selection of the home shopping channel during a predetermined period and the k-th reference frequency is the number of times that a product belonging to the k-th product classification is provided through the home shopping channel for a time period longer than or equal to the first threshold from the selection of the home shopping channel during the predetermined period. The first sub-instruction 150-8-1 also determines each of a first bounce frequency to a k-th bounce frequency where the first bounce frequency is the number of times that the product belonging to the first product classification is provided through the home shopping channel for a time period longer than or equal to the first threshold and shorter than or equal to a second threshold from the selection of the home shopping channel during the predetermined period and the k-th bounce frequency is the number of times that the product belonging to the k-th product classification is provided through the home shopping channel for a time period longer than or equal to the first threshold and shorter than or equal to the second period from the selection of the home shopping channel during the predetermined period.

The detailed description of the first sub-instruction 150-8-1 will be omitted since the descriptions of the first process described above can be referred to therefor.

The second sub-instruction 150-8-2, when executed, determines a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency.

The detailed description of the second sub-instruction 150-8-2 will be omitted since the descriptions of the second process described above can be referred to therefor.

The third sub-instruction 150-8-3, when executed, analyzes the viewing history to calculate a first average viewing time to a k-th average viewing time where the first average viewing time is a time period during which a product belonging to the first product classification is provided through the home shopping channel during the predetermined period and the k-th average viewing time is a time period during which a product belonging to the k-th product classification is provided through the home shopping channel during the predetermined period.

The detailed description of the third sub-instruction 150-8-3 will be omitted since the descriptions of the third process described above can be referred to therefor.

The fourth sub-instruction 150-8-4, when executed, compares interest indices for the first to k-th product classifications with a predetermined threshold where the interest index for the first product classification is extracted based on the first average viewing time and the first bounce rate and the interest index for the k-th product classification is extracted based on the k-th average viewing time and the k-th bounce rate. Then, the fourth sub-instruction 150-8-4 specifies a product classification(s) having an interest index higher than the predetermined threshold among the first to k-th product classifications as the product classification group of interest.

The detailed description of the fourth sub-instruction 150-8-4 will be omitted since the descriptions of the fourth process described above can be referred to therefor.

Third Embodiment

According to the first and second embodiments, any one of the first to m-th personalized contents and the basic content is provided. The viewer of the personalized home shopping providing apparatus 100 may want to watch the basic content even when one of the first to m-th personalized contents is provided through the personalized home shopping providing apparatus 100. According to the third embodiment, even when one of the first to m-th personalized contents is provided through the personalized home shopping providing apparatus 100, the basic content may be provided to the viewer.

As described above, the program 150 may further include the ninth instruction 150-9.

The ninth instruction 150-9, when executed, displays a user interface for providing the basic content before performing the third instruction 150-3 or while performing the third instruction 150-3.

Figure 10:
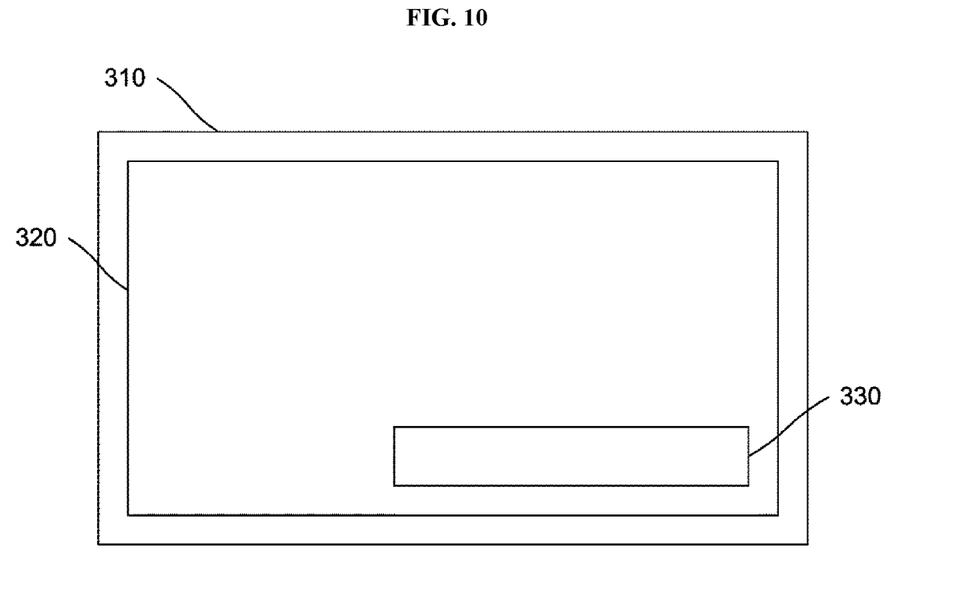
FIG. 10 shows an example of a user interface for providing a basic content in the personalized home shopping providing apparatus according to the embodiments described herein.

FIG. 10 shows an example of a user interface for providing the basic content in the personalized home shopping providing apparatus according to the embodiments described herein. FIG. 10 shows an example in which a user interface for providing the basic content while performing the third instruction 152-3 is displayed.

Referring to FIG. 10, one personalized content 320 of the first to m-th personalized contents is displayed on a screen 310 of the display device 300 through the third instruction 150-3. While the personalized content 320 of the first to m-th personalized contents is displayed on the screen 310, a user interface 330 for providing the basic content is displayed on at least a portion of the screen 310.

The user interface 330 may be, for example, a user interface displaying a guide phrase such as "If you want to watch the basic home shopping content currently being broadcast, press the green button."

As described above, in accordance with the embodiments described above, a home shopping content suitable for a specific viewer can be dynamically selected and provided using the product classification group of interest extracted based on the time at which the viewer selects the home shopping channel and the time at which the viewer leaves the home shopping channel. In particular, since the product classification group of interest can be extracted using an interest index calculated based on the bounce rate defined according to the embodiments described herein, the more personalized home shopping content can be provided to the viewer.

While various examples according to the technique have been described in detail, the above descriptions merely illustrates the idea of the technique described herein, and it will be understood by those skilled in the art to which the technique described herein belongs that various changes and modifications may be made without departing from the scope of the essential characteristics of the technique described herein.

Accordingly, the exemplary embodiments disclosed herein are not used to limit the idea of the technique described herein, but to explain the technique described herein, and the scope of the technical idea of the technique described herein is not limited by those embodiments. Therefore, the scope of protection of the technique described herein should be construed as defined in the following claims, and all technical ideas that fall within the idea of the technique described herein are intended to be embraced by the scope of the claims described below.

In accordance with the embodiments of the technique described herein, a home shopping content suitable for a specific viewer can be dynamically selected and provided using the product classification group of interest extracted based on the time at which the viewer selects the home shopping channel and the time at which the viewer leaves the home shopping channel. In particular, since the product classification group of interest can be extracted using an interest index calculated based on the bounce rate defined according to the embodiments described herein, the more personalized home shopping content can be provided to the viewer.

[Supplementary Notes]

Embodiments of the technique described herein will be supplementarily described below.

<Supplementary Note 1>

According to one aspect of the present disclosure, there is provided a method of providing a personalized content using a personalized home shopping providing apparatus including: one or more memories storing the program therein; and one or more processors configured to execute the program, the method including:

(a) generating a viewing history of a home shopping channel and transmits the viewing history to a predetermined broadcast system;

(b) receiving a viewer input of selecting the home shopping channel; and (c) performing a signal-processing of a content selected from among a first personalized content to an m-th personalized content and a basic content that is provided by the predetermined broadcast system by using a product classification group of interest and providing the signal-processed content where "m" is a natural number greater than or equal to 1 and the product classification group of interest is extracted from a product classification criterion including a first product classification to a k-th product classification based on the viewing history where "k" is a natural number of 2 or more.

<Supplementary Note 2>

The method of Supplementary note 1, wherein the viewing history includes:

a time at which a provision of the home shopping channel is started, and one of a time at which the provision of the home shopping channel is ended and a difference between the time at which the provision of the home shopping channel is ended and the time at which the provision of the home shopping channel is started.

<Supplementary Note 3>

The method of Supplementary note 1, wherein the basic content and the first to m-th personalized contents are transmitted in real time or semi-real time from the predetermined broadcast system through a broadcast network or a communication network.

<Supplementary Note 4>

The method of Supplementary note 1, wherein the content is transmitted from the predetermined broadcast system by using one of a broadcast method, a multicast method, a unicast method and a VOD method through a broadcast network or a communication network.

<Supplementary Note 5>

The method of Supplementary note 1, further including:

(d) dynamically selecting the content from among the first to m-th personalized contents and the basic content based on the product classification group of interest and receiving the selected content from the predetermined broadcast system.

<Supplementary Note 6>

The method of Supplementary note 1, further including:

(e) receiving the content selected from among the first to m-th personalized contents and the basic content by the predetermined broadcast system based on the product classification group of interest.

<Supplementary Note 7>

The method of Supplementary note 1, further including:

(f) dynamically selecting the content from among the first to m-th personalized contents and the basic content based on the product classification group of interest, transmits a request for transmitting the selected content to the predetermined broadcast system, and receiving the selected content from the predetermined broadcast system.

<Supplementary Note 8>

The method of Supplementary note 1, further including:

(g) receiving and storing the product classification group of interest from the predetermined broadcast system.

<Supplementary Note 9>

The method of Supplementary note 8, wherein the predetermined broadcast system extract the product classification group of interest by performing a first process, a second process, a third process and a fourth process, wherein the first process, when executed, analyzes the viewing history to determine each of a first reference frequency to a k-th reference frequency where the first reference frequency is the number of times that a product belonging to the first product classification is provided through the home shopping channel for a time period longer than or equal to a first threshold from a selection of the home shopping channel during a predetermined period and the k-th reference frequency is the number of times that a product belonging to the k-th product classification is provided through the home shopping channel for a time period longer than or equal to the first threshold from the selection of the home shopping channel during the predetermined period, and to determine each of a first bounce frequency to a k-th bounce frequency where the first bounce frequency is the number of times that the product belonging to the first product classification is provided through the home shopping channel for a time period longer than or equal to the first threshold and shorter than or equal to a second threshold from the selection of the home shopping channel during the predetermined period and the k-th bounce frequency is the number of times that the product belonging to the k-th product classification is provided through the home shopping channel for a time period longer than or equal to the first threshold and shorter than or equal to the second period from the selection of the home shopping channel during the predetermined period;

the second process, when executed, determines a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency;

the third process, when executed, analyzes the viewing history to calculate a first average viewing time to a k-th average viewing time where the first average viewing time is a time period during which the product belonging to the first product classification is provided through the home shopping channel during the predetermined period and the k-th average viewing time is a time period during which the product belonging to the k-th product classification is provided through the home shopping channel during the predetermined period; and the fourth process, when executed, compares interest indices for the first to k-th product classifications with a predetermined threshold where the interest index for the first product classification is extracted based on the first average viewing time and the first bounce rate and the interest index for the k-th product classification is extracted based on the k-th average viewing time and the k-th bounce rate, and the fourth process specifies a product classification having an interest index higher than the predetermined threshold among the first to k-th product classifications as the product classification group of interest.

<Supplementary Note 10>

The method of Supplementary note 1, further including:

(h) extracting the product classification group of interest based on a broadcasting schedule and the viewing history of the home shopping channel.

<Supplementary Note 11>

The method of Supplementary note 10, (h) includes:

(h-1) analyzing the broadcasting schedule and the viewing history of the home shopping channel to determine each of a first reference frequency to a k-th reference frequency where the first reference frequency is the number of times that a product belonging to the first product classification is provided through the home shopping channel for a time period longer than or equal to a first threshold from a selection of the home shopping channel during a predetermined period and the k-th reference frequency is the number of times that a product belonging to the k-th product classification is provided through the home shopping channel for a time period longer than or equal to the first threshold from the selection of the home shopping channel during the predetermined period, and to determine each of a first bounce frequency to a k-th bounce frequency where the first bounce frequency is the number of times that the product belonging to the first product classification is provided through the home shopping channel for a time period longer than or equal to the first threshold and shorter than or equal to a second threshold from the selection of the home shopping channel during the predetermined period and the k-th bounce frequency is the number of times that the product belonging to the k-th product classification is provided through the home shopping channel for a time period longer than or equal to the first threshold and shorter than or equal to the second period from the selection of the home shopping channel during the predetermined period;

(h-2) determining a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency;

(h-3) analyzing the viewing history to calculate a first average viewing time to a k-th average viewing time where the first average viewing time is a time period during which the product belonging to the first product classification is provided through the home shopping channel during the predetermined period and the k-th average viewing time is a time period during which the product belonging to the k-th product classification is provided through the home shopping channel during the predetermined period; and (h-4) comparing interest indices for the first to k-th product classifications with a predetermined threshold where the interest index for the first product classification is extracted based on the first average viewing time and the first bounce rate and the interest index for the k-th product classification is extracted based on the k-th average viewing time and the k-th bounce rate, and specifying a product classification having an interest index higher than the predetermined threshold among the first to k-th product classifications as the product classification group of interest.

<Supplementary Note 12>

The method of Supplementary note 11, wherein an interest index for a j-th product classification among the first to k-th product classifications where "j" is a natural number greater than or equal to 1 and smaller than or equal to "k" is determined as a value obtained by subtracting, from a value obtained by multiplying a normalized j-th average viewing time by a first weight, a value obtained by multiplying a normalized j-th bounce rate by a second weight.

<Supplementary Note 13>

The method of Supplementary note 12, wherein the first weight and the second weight are positive numbers, and the sum of the first weight and the second weight is 1.

<Supplementary Note 14>

The method of Supplementary note 1, wherein the product classification group of interest includes one or more of the first to k-th product classifications.

<Supplementary Note 15>

The method of Supplementary note 1, wherein the content is one of the first to m-th personalized contents, and further includes (i) displaying a user interface for providing the basic content before performing (c) or while performing (c).

[Description of Reference Numerals]

| | |
|---|---|
| 100: personalized home shopping providing apparatus | 110: processor |
| 130: memory | 150: program |
| 200: broadcast system | 300: display device |
| 310: screen | 320: personalized content |
| 330: user interface | |

What is claimed is:

1. A personalized home shopping providing apparatus comprising:
   one or more processors;
   one or more memories; and
   one or more programs that are stored in the one or more memories and executed by the one or more processors, wherein the one or more programs includes:
      a first instruction that, when executed, generates a viewing history of a home shopping channel and transmits the viewing history to a predetermined broadcast system;
      a second instruction that, when executed, receives a viewer input of selecting the home shopping channel;
      a third instruction that, when executed, performs a signal-processing of a content selected from among a first personalized content to an m-th personalized content and a basic content that is provided by the predetermined broadcast system by using a product classification group of interest and provides the signal-processed content where "m" is a natural number greater than or equal to 1 and the product classification group of interest is extracted from a product classification criterion including a first product classification to a k-th product classification based on the viewing history where "k" is a natural number of 2 or more; and
      a fourth instruction that, when executed, extracts the product classification group of interest based on a broadcasting schedule and the viewing history of the home shopping channel,
   wherein the fourth instruction includes:
      a first sub-instruction that, when executed, analyzes the broadcasting schedule and the viewing history of the home shopping channel to determine each of a first reference frequency to a k-th reference frequency where the first reference frequency is the number of times that a product belonging to the first product classification is provided through the home shopping channel for a time period longer than or equal to a first threshold from a selection of the home shopping channel during a predetermined period and the k-th reference frequency is the number of times that a product belonging to the k-th product classification is provided through the home shopping channel for a time period longer than or equal to the first threshold from the selection of the home shopping channel during the predetermined period, and to determine each of a first bounce frequency to a k-th bounce frequency where the first bounce frequency is the number of times that the product belonging to the first product classification is provided through the home shopping channel for a time period longer than or equal to the first threshold and shorter than or equal to a second threshold from the selection of the home shopping channel during the predetermined period and the k-th bounce frequency is the number of times that the product belonging to the k-th product classification is provided through the home shopping channel for a time period longer than or equal to the first threshold and shorter than or equal to the second period from the selection of the home shopping channel during the predetermined period;
      a second sub-instruction that, when executed, determines a first bounce rate for the first product classification to a k-th bounce rate for the k-th product classification where the first bounce rate is a ratio of the first bounce frequency to the first reference frequency and the k-th bounce rate is a ratio of the k-th bounce frequency to the k-th reference frequency;
      a third sub-instruction that, when executed, analyzes the viewing history to calculate a first average viewing time to a k-th average viewing time where the first average viewing time is a time period during which the product belonging to the first product classification is provided through the home shopping channel during the predetermined period and the k-th average viewing time is a time period during which the product belonging to the k-th product classification is provided through the home shopping channel during the predetermined period; and a fourth sub-instruction that, when executed, compares interest indices for the first to k-th product classifications with a predetermined threshold where an interest index for the first product classification is extracted based on the first average viewing time and the first bounce rate and an interest index for the k-th product classification is extracted based on the k-th average viewing time and the k-th bounce rate, and the fourth sub-instruction specifies a product classification having an interest index higher than the predetermined threshold among the first to k-th product classifications as the product classification group of interest.

2. The personalized home shopping providing apparatus of claim 1, wherein the viewing history includes:
a time at which a provision of the home shopping channel is started, and
one of a time at which the provision of the home shopping channel is ended and a difference between the time at which the provision of the home shopping channel is ended and the time at which the provision of the home shopping channel is started.

3. The personalized home shopping providing apparatus of claim 1, wherein the basic content and the first to m-th personalized contents are transmitted in real time or semi-real time from the predetermined broadcast system through a broadcast network or a communication network.

4. The personalized home shopping providing apparatus of claim 1, wherein the content is transmitted from the predetermined broadcast system by using one of a broadcast method, a multicast method, a unicast method and a VOD method through a broadcast network or a communication network.

5. The personalized home shopping providing apparatus of claim 1, wherein the one or more programs further include:
a fifth instruction that, when executed, dynamically selects the content from among the first to m-th personalized contents and the basic content based on the product classification group of interest and receives the selected content from the predetermined broadcast system.

6. The personalized home shopping providing apparatus of claim 1, wherein the one or more programs further include:
a sixth instruction that, when executed, receives the content selected from among the first to m-th personalized contents and the basic content by the predetermined broadcast system based on the product classification group of interest.

7. The personalized home shopping providing apparatus of claim 1, wherein the one or more programs further include:
a seventh instruction that, when executed, dynamically selects the content from among the first to m-th personalized contents and the basic content based on the product classification group of interest, transmits a request for transmitting the selected content to the predetermined broadcast system, and receives the selected content from the predetermined broadcast system.

8. The personalized home shopping providing apparatus of claim 1, wherein the one or more programs further include:
an eighth instruction that, when executed, receives and stores the product classification group of interest from the predetermined broadcast system.

9. The personalized home shopping providing apparatus of claim 8, wherein the predetermined broadcast system extracts the product classification group of interest.

10. The personalized home shopping providing apparatus of claim 1, wherein an interest index for a j-th product classification among the first to k-th product classifications where "j" is a natural number greater than or equal to 1 and smaller than or equal to "k" is determined as a value obtained by subtracting, from a value obtained by multiplying a normalized j-th average viewing time by a first weight, a value obtained by multiplying a normalized j-th bounce rate by a second weight.

11. The personalized home shopping providing apparatus of claim 10, wherein the first weight and the second weight are positive numbers, and the sum of the first weight and the second weight is 1.

12. The personalized home shopping providing apparatus of claim 1, wherein the product classification group of interest includes one or more of the first to k-th product classifications.

13. The personalized home shopping providing apparatus of claim 1, wherein the content is one of the first to m-th personalized contents, and
the one or more programs further include a ninth instruction that, when executed, displays a user interface for providing the basic content before performing the third instruction or while performing the third instruction.

* * * * *